US011042646B2

(12) United States Patent
Bhosale et al.

(10) Patent No.: US 11,042,646 B2
(45) Date of Patent: Jun. 22, 2021

(54) SELECTING DATA STORAGE BASED ON DATA AND STORAGE CLASSIFICATIONS

(71) Applicant: International Business Machines Corporation, Armonk, NY (US)

(72) Inventors: Nilesh P. Bhosale, Pune (IN); Abhishek Jain, Baraut (IN); Sandeep R. Patil, Pune (IN); Ashish Chaurasia, Pune (IN)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 16/102,610

(22) Filed: Aug. 13, 2018

(65) Prior Publication Data
US 2020/0050769 A1 Feb. 13, 2020

(51) Int. Cl.
*G06F 21/57* (2013.01)
*G06F 3/06* (2006.01)
*G06F 16/907* (2019.01)

(52) U.S. Cl.
CPC ............ *G06F 21/577* (2013.01); *G06F 3/062* (2013.01); *G06F 3/0647* (2013.01); *G06F 3/0683* (2013.01); *G06F 16/907* (2019.01)

(58) Field of Classification Search
CPC ...... G06F 21/577; G06F 16/907; G06F 3/062; G06F 3/0683; G06F 3/0647; G06F 3/0685; G06F 3/0649; G06F 21/6218
See application file for complete search history.

(56) References Cited

U.S. PATENT DOCUMENTS

| 7,293,133 | B1 * | 11/2007 | Colgrove | G06F 3/0608 |
| | | | | 711/111 |
| 10,078,458 | B1 * | 9/2018 | Shapiro | G06F 3/0679 |
| 10,095,418 | B1 * | 10/2018 | Gong | G06F 3/061 |
| 10,601,679 | B2 * | 3/2020 | Lynar | G06F 3/0647 |
| 2006/0005189 | A1 * | 1/2006 | Vega | G06F 9/4856 |
| | | | | 718/1 |
| 2011/0202916 | A1 * | 8/2011 | VoBa | G06F 9/45558 |
| | | | | 718/1 |
| 2014/0337086 | A1 * | 11/2014 | Asenjo | H04L 41/0896 |
| | | | | 705/7.28 |
| 2015/0347245 | A1 | 12/2015 | Andre et al. | |
| 2016/0077966 | A1 | 3/2016 | Stabrawa et al. | |
| 2016/0283713 | A1 * | 9/2016 | Brech | G06F 9/45558 |
| 2016/0323301 | A1 * | 11/2016 | Boss | G06F 21/577 |
| 2017/0139595 | A1 * | 5/2017 | Doerner | G06F 3/0632 |

(Continued)

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Michael R Vaughan
(74) *Attorney, Agent, or Firm* — Zilka-Kotab, P.C.

(57) ABSTRACT

A computer-implemented method according to one embodiment includes determining a classification associated with an instance of data, determining a vulnerability level of a first storage system at which the instance of data is currently located, and conditionally migrating the instance of data from the first storage system to a second storage system, based on the classification associated with the instance of data and the vulnerability level of the first storage system.

21 Claims, 8 Drawing Sheets

(56) References Cited

U.S. PATENT DOCUMENTS

| | | |
|---|---|---|
| 2018/0089780 A1 | 3/2018 | Brooker et al. |
| 2018/0260574 A1* | 9/2018 | Morello ................ G06F 21/577 |
| 2019/0073365 A1* | 3/2019 | Jamshidi ............. G06F 16/9535 |
| 2019/0130310 A1* | 5/2019 | Madhava Rao ...... G06F 16/245 |
| 2019/0250845 A1* | 8/2019 | Kabra ................... G06F 3/0616 |
| 2020/0042228 A1* | 2/2020 | Roberts ................ G06F 3/0689 |

OTHER PUBLICATIONS

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

\* cited by examiner

SELECTING DATA STORAGE BASED ON DATA AND STORAGE CLASSIFICATIONS

BACKGROUND

The present invention relates to data security, and more specifically, this invention relates to dynamically selecting a secure storage location for data based on characteristics of the storage and characteristics of the data.

The storage of data in a storage cluster is a common practice. Within the storage cluster, data may be stored in a variety of different storage systems, where each storage system may have characteristics (e.g., hardware, software, firmware, etc.) different from other storage systems within the storage cluster. Many times, security vulnerabilities may exist for certain characteristics shared only by a subset of the storage systems within the storage cluster.

However, current implementations fail to account for these vulnerabilities, which places sensitive data at risk when such data is stored on vulnerable storage systems. There is therefore a need to identify sensitive data and move it from vulnerable storage systems to secure storage systems within a storage cluster.

SUMMARY

A computer-implemented method according to one embodiment includes determining a classification associated with an instance of data, determining a vulnerability level of a first storage system at which the instance of data is currently located, and conditionally migrating the instance of data from the first storage system to a second storage system, based on the classification associated with the instance of data and the vulnerability level of the first storage system.

In this way, data security may be improved within the storage cluster by associating predetermined security criteria with data and ensuring that only storage systems meeting the predetermined security criteria store the data. This may prevent the performance of undesired/malicious actions on sensitive data stored within the storage cluster, which may prevent data corruption within the storage cluster. This may also improve a performance of the storage cluster, since the need to replace corrupted data within the cluster may be prevented by appropriately securing the data within the storage cluster. Also, the use of storage space on secure storage systems of a storage cluster may be optimized, such that the storage space is used to prioritize the storage of sensitive data over non-sensitive data.

In one optional embodiment, the classification of the instance of data is compared to a first predetermined threshold, and in response to determining that the classification of the instance of data exceeds the first predetermined threshold, the vulnerability level of the first storage system is compared to a second predetermined threshold. In response to determining that the vulnerability level of the first storage system is below the second predetermined threshold, the instance of data is maintained on the first storage system. In response to determining that the vulnerability level of the first storage system is above the second predetermined threshold, the instance of data is migrated to the second storage system, where the second storage system has a vulnerability level below the second predetermined threshold.

In another optional embodiment, a vulnerability level for the first storage system indicates that the first storage system is vulnerable. In response to determining that the first storage system has currently implemented one or more solutions to eliminate one or more existing vulnerabilities of the first storage system, the vulnerability level of the first storage system is updated to indicate that the first storage system is secure. In response to the updating of the vulnerability level of the first storage system, the updated vulnerability level is compared to a second predetermined threshold. In response to determining that the updated vulnerability level is below the second predetermined threshold, the instance of data is migrated back to the first storage system.

According to another embodiment, a computer program product for adjusting firewall parameters based on node characteristics includes a computer readable storage medium that has program instructions embodied therewith, where the computer readable storage medium is not a transitory signal per se, and where the program instructions are executable by a processor to cause the processor to perform a method including determining, by the processor, a classification associated with an instance of data, determining, by the processor, a vulnerability level of a first storage system at which the instance of data is currently located, and conditionally migrating, by the processor, the instance of data from the first storage system to a second storage system, based on the classification associated with the instance of data and the vulnerability level of the first storage system.

A system according to another embodiment includes a processor, and logic integrated with the processor, executable by the processor, or integrated with and executable by the processor, where the logic is configured to determine a classification associated with an instance of data, determine a vulnerability level of a first storage system at which the instance of data is currently located, and conditionally migrate the instance of data from the first storage system to a second storage system, based on the classification associated with the instance of data and the vulnerability level of the first storage system.

According to another embodiment, a computer-implemented method includes receiving an instance of data to be stored within a storage cluster, determining a classification associated with the instance of data, determining a storage system of the storage cluster to store the instance of data, based on the classification associated with the instance of data and a vulnerability level of the storage system, and storing the instance of data within the storage system of the storage cluster.

In this way, incoming data may be stored within a storage system of a storage cluster that provides an appropriate level of security for the incoming data.

According to another embodiment, a computer-implemented method includes identifying a new vulnerability for a first storage system of a storage cluster, updating a current vulnerability level of the first storage system to an updated vulnerability level of the first storage system, based on the new vulnerability, and conditionally migrating an instance of data from the first storage system to a second storage system within the storage cluster, based on a classification associated with the instance of data and the updated vulnerability level of the first storage system.

In this way, data may be dynamically transferred to a secure storage system from an insecure storage system, in response to an identification of the insecure storage system.

Other aspects and embodiments of the present invention will become apparent from the following detailed description, which, when taken in conjunction with the drawings, illustrate by way of example the principles of the invention.

DETAILED DESCRIPTION

Figure 1:
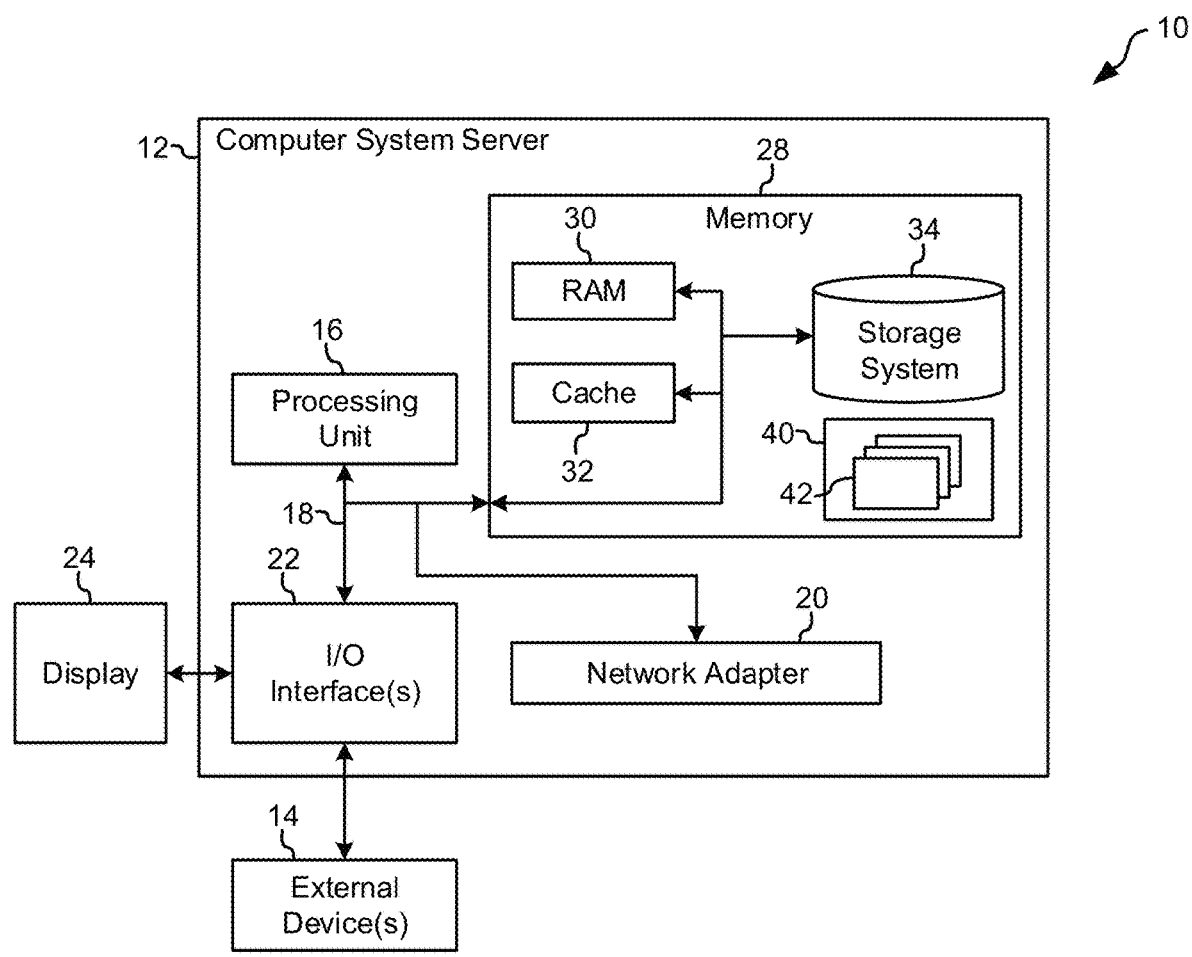
FIG. 1 depicts a cloud computing node according to an embodiment of the present invention.

The following description discloses several preferred embodiments of systems, methods and computer program products for selecting data storage based on data and storage classifications. Various embodiments provide a method for determining a location where data should be stored, based on a classification of the data and vulnerabilities of one or more storage locations.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selecting data storage based on data and storage classifications.

In one general embodiment, a computer-implemented method includes determining a classification associated with an instance of data, determining a vulnerability level of a first storage system at which the instance of data is currently located, and conditionally migrating the instance of data from the first storage system to a second storage system, based on the classification associated with the instance of data and the vulnerability level of the first storage system.

In this way, data security may be improved within the storage cluster by associating predetermined security criteria with data and ensuring that only storage systems meeting the predetermined security criteria store the data. This may prevent the performance of undesired/malicious actions on sensitive data stored within the storage cluster, which may prevent data corruption within the storage cluster. This may also improve a performance of the storage cluster, since the need to replace corrupted data within the cluster may be prevented by appropriately securing the data within the storage cluster. Also, the use of storage space on secure storage systems of a storage cluster may be optimized, such that the storage space is used to prioritize the storage of sensitive data over non-sensitive data.

In one optional embodiment, the classification of the instance of data is compared to a first predetermined threshold, and in response to determining that the classification of the instance of data exceeds the first predetermined threshold, the vulnerability level of the first storage system is compared to a second predetermined threshold. In response to determining that the vulnerability level of the first storage system is below the second predetermined threshold, the instance of data is maintained on the first storage system. In response to determining that the vulnerability level of the first storage system is above the second predetermined threshold, the instance of data is migrated to the second storage system, where the second storage system has a vulnerability level below the second predetermined threshold.

In another optional embodiment, a vulnerability level for the first storage system indicates that the first storage system is vulnerable. In response to determining that the first storage system has currently implemented one or more solutions to eliminate one or more existing vulnerabilities of the first storage system, the vulnerability level of the first storage system is updated to indicate that the first storage system is secure. In response to the updating of the vulnerability level of the first storage system, the updated vulnerability level is compared to a second predetermined threshold. In response to determining that the updated vulnerability level is below the second predetermined threshold, the instance of data is migrated back to the first storage system.

In another general embodiment, a computer program product for adjusting firewall parameters based on node characteristics includes a computer readable storage medium that has program instructions embodied therewith, where the computer readable storage medium is not a transitory signal per se, and where the program instructions are executable by a processor to cause the processor to perform a method including determining, by the processor, a classification associated with an instance of data, determining, by the processor, a vulnerability level of a first storage system at which the instance of data is currently located, and conditionally migrating, by the processor, the instance of data from the first storage system to a second storage system, based on the classification associated with the instance of data and the vulnerability level of the first storage system.

In another general embodiment, a system includes a processor, and logic integrated with the processor, executable by the processor, or integrated with and executable by the processor, where the logic is configured to determine a classification associated with an instance of data, determine a vulnerability level of a first storage system at which the instance of data is currently located, and conditionally migrate the instance of data from the first storage system to a second storage system, based on the classification associated with the instance of data and the vulnerability level of the first storage system.

In another general embodiment, a computer-implemented method includes receiving an instance of data to be stored within a storage cluster, determining a classification associated with the instance of data, determining a storage system of the storage cluster to store the instance of data, based on the classification associated with the instance of data and a vulnerability level of the storage system, and storing the instance of data within the storage system of the storage cluster.

In this way, incoming data may be stored within a storage system of a storage cluster that provides an appropriate level of security for the incoming data.

In another general embodiment, a computer-implemented method includes identifying a new vulnerability for a first storage system of a storage cluster, updating a current vulnerability level of the first storage system to an updated vulnerability level of the first storage system, based on the new vulnerability, and conditionally migrating an instance of data from the first storage system to a second storage system within the storage cluster, based on a classification associated with the instance of data and the updated vulnerability level of the first storage system.

In this way, data may be dynamically transferred to a secure storage system from an insecure storage system, in response to an identification of the insecure storage system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
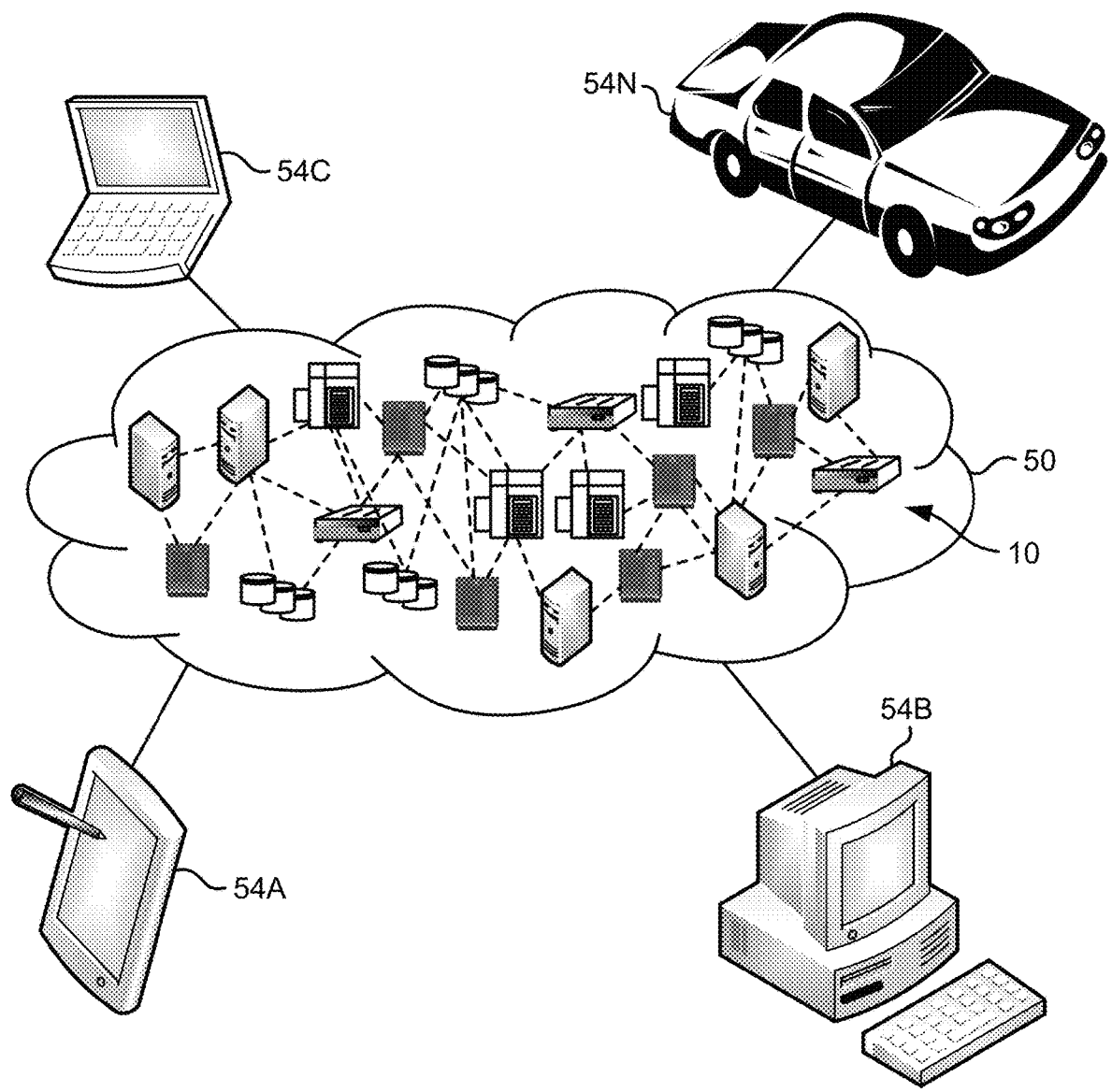
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
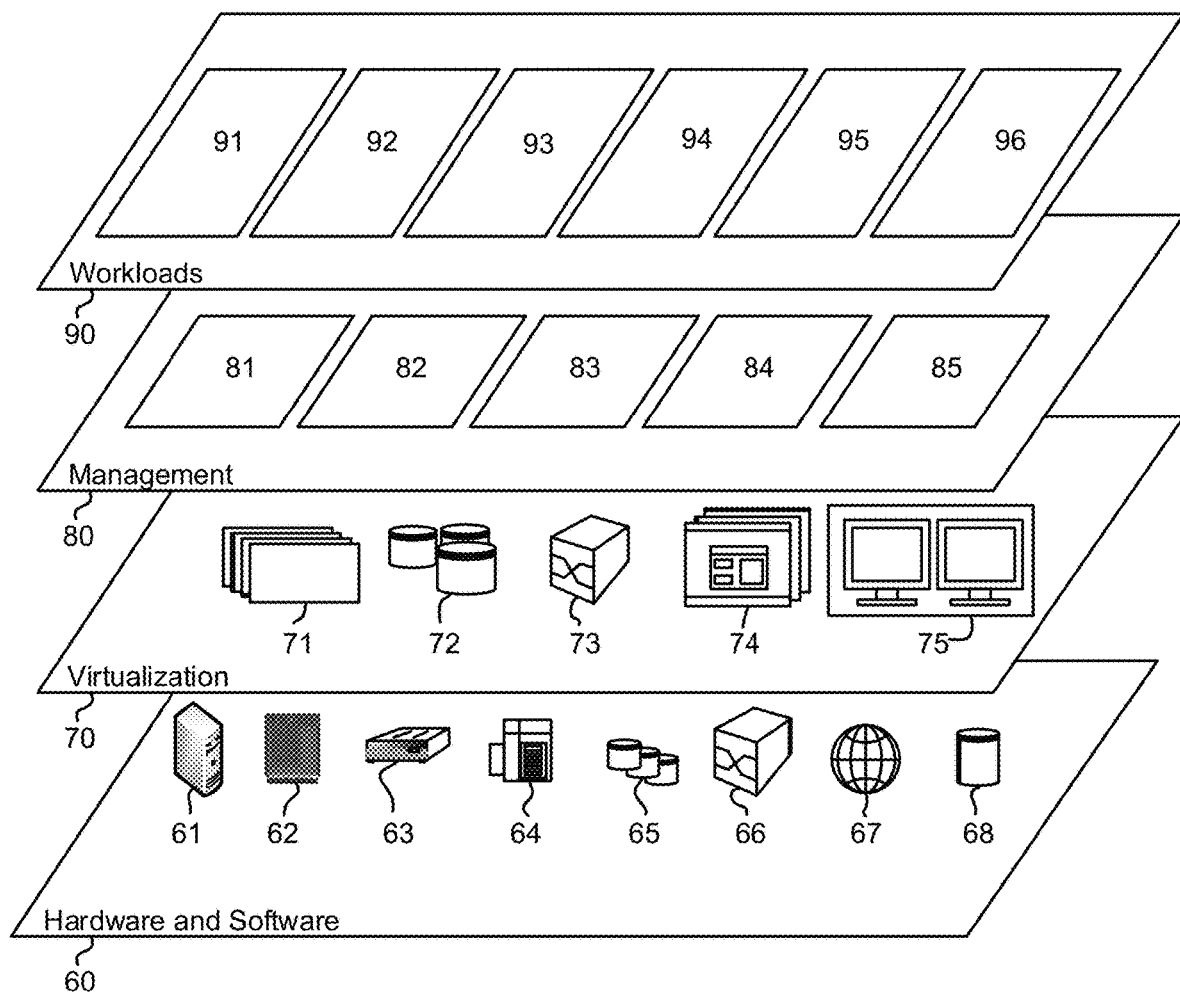
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
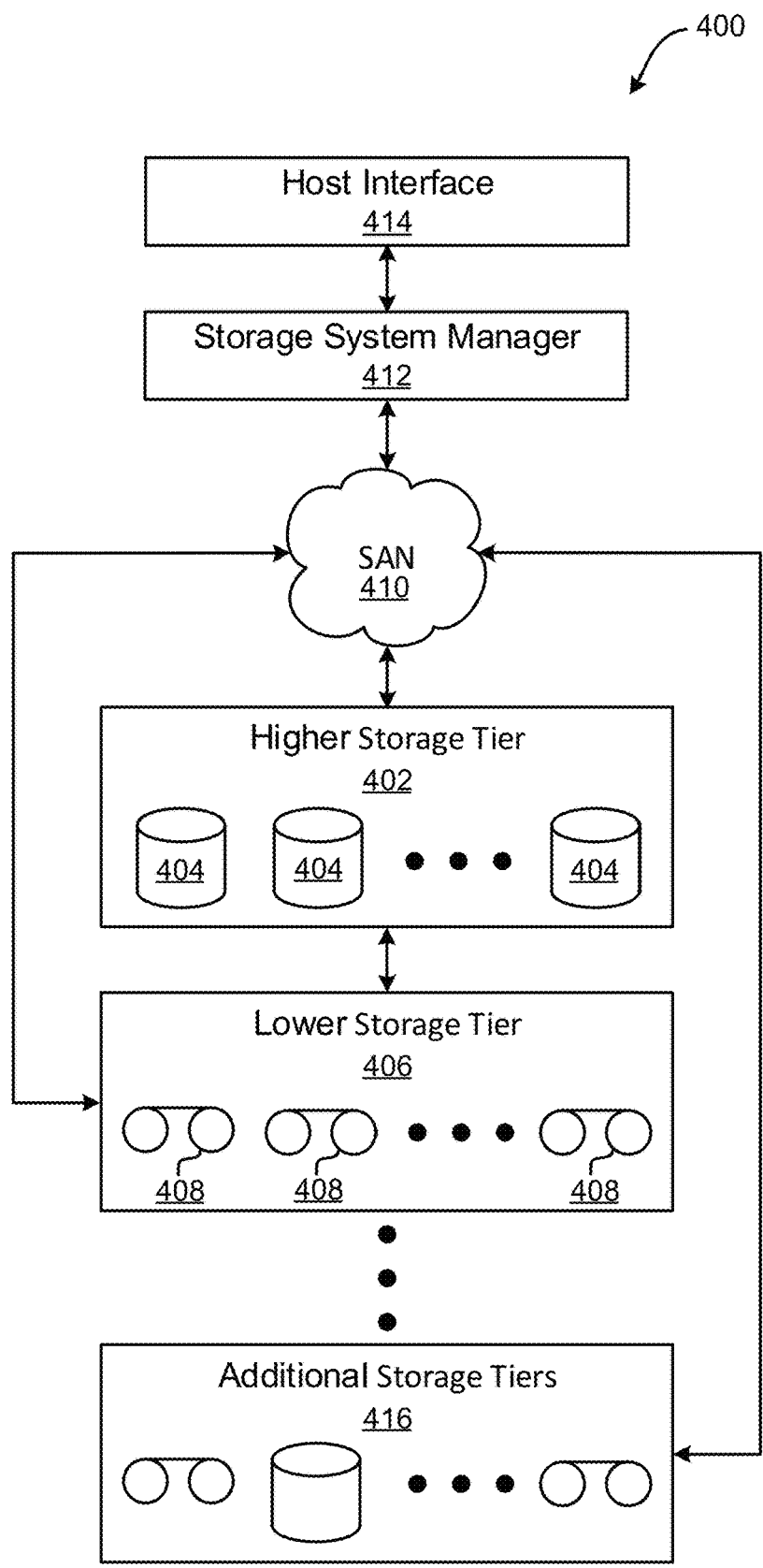
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. In one embodiment, the lower storage tier(s) 406 may include one or more storage tiers with a higher vulnerability than the higher storage tier(s) 402. For example, the at least one higher storage tier 402 may have a lower vulnerability level than the at least one lower storage tier 406, where the vulnerability level is defined at a plurality of levels (e.g., high vulnerability, medium vulnerability, low vulnerability, etc.). One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
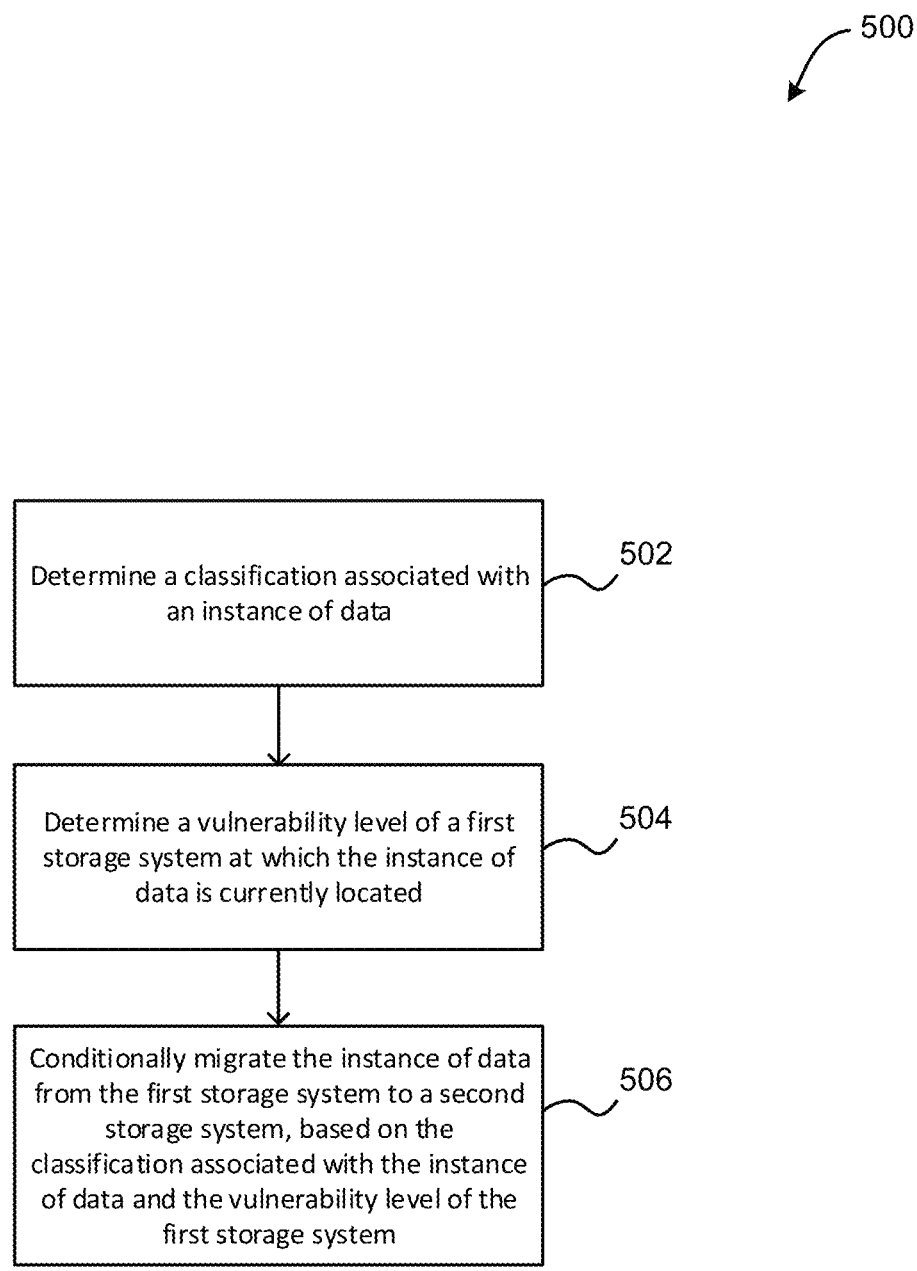
FIG. 5 illustrates a flowchart of a method for selecting data storage based on data and storage classifications, in accordance with one embodiment.

Now referring to FIG. 5, a flowchart of a method 500 is shown according to one embodiment. The method 500 may be performed in accordance with the present invention in any of the environments depicted in FIGS. 1-4 and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a classification associated with an instance of data is determined. In one embodiment, the instance of data may include a file, an object, etc. In another embodiment, the instance of data is stored within a storage cluster. For example, the instance of data may be stored within an individual storage system that is part of a storage cluster. In another example, the storage cluster may be heterogeneous (e.g., each storage system within the cluster may have its own operating system, hardware, software, firmware, etc.). In another embodiment, the storage cluster may include a cloud-based storage environment.

Additionally, in one embodiment, determining the classification includes extracting a header of the instance of data. In another embodiment, determining the classification may include adding custom metadata to the instance of data. In yet another embodiment, determining the classification may include deriving metadata from the instance of data itself. In still another embodiment, determining the classification may include performing a deep data inspection of the instance of data.

Further, in one embodiment, determining the classification includes performing one or more of content analytics and sentiment analytics on the instance of data to determine metadata associated with the instance of data. In another embodiment, determining the classification may include performing natural language classification on one or more aspects of the instance of data (e.g., a name of the data, text included within metadata for the data, text included within the instance of data itself, etc.).

Further still, in one embodiment, determining the classification may include performing speech to text conversion on one or more aspects of the instance of data (e.g. when the instance of data includes audio, etc.). In another embodiment, determining the classification may include performing visual recognition on one or more aspects of the instance of data (e.g. when the instance of data includes one or more images and/or video, etc.).

Also, in one embodiment, the classification includes a compliance level for the instance of data. For example, the compliance level may indicate a sensitivity of the instance of data, a desired security level for the instance of data, etc. In another embodiment, the classification may be determined in response to the creation of the instance of data. For example, the instance of data may be created and stored within a storage system of a storage cluster. In another example, in response to the creation and storage of the instance of data, the instance of data may be analyzed in order to determine a classification for the data.

In addition, in one embodiment, the classification may be determined according to a predetermined schedule. For example, all unclassified instances of data may be analyzed in order to determine a classification for the instance of data. In another example, such analysis may occur at a predetermined interval, according to a schedule, etc. In another embodiment, the classification may be determined according to a predetermined scale. For example, the classification may be determined from a scale of values one to five, where a value of one indicates a low sensitivity that merits a low level of security, and sensitivity/security levels increase to a value of five, which indicates a high sensitivity that merits a high level of security.

Furthermore, method 500 may proceed with operation 504, where a vulnerability level of a first storage system at which the instance of data is currently located is determined. In one embodiment, the instance of data may be currently stored at the first storage system. In another embodiment, the first storage system may be included within a storage cluster. For example, the storage cluster may include a plurality of storage systems that work together to store data.

Further still, in one embodiment, the storage cluster implements storage virtualization. For example, the storage cluster may include a software defined storage (SDS) model cluster that includes a plurality of individual storage systems, where storage software for is used for policy-based provisioning and management of data storage independent of the underlying hardware. In another embodiment, each storage system within the storage cluster may include a commercial off the shelf (COTS) system.

Also, in one embodiment, each storage system within the storage cluster may implement its own hardware, operating system, software, etc. In another embodiment, determining the vulnerability level of the first storage system may include identifying hardware implemented within the first storage system. For example, the hardware may include one or more processors within the first storage system, one or more storage drives within the first storage system (e.g., one or more tape drives, hard disk drives, flash drives, cloud drives, etc.), one or more network communication hardware elements within the first storage system, a hardware architecture of the first storage system, etc.

Additionally, in one embodiment, determining the vulnerability level of the first storage system includes identifying firmware and/or software currently implemented within the first storage system. For example, the firmware and/or software may include an operating system of the first storage system, one or more current drivers installed within the first storage system. In another embodiment, determining the vulnerability level of the first storage system may include identifying one or more existing hardware and/or software vulnerabilities.

For example, the hardware and/or software vulnerabilities may include security vulnerabilities associated with the hardware and/or software. This may include automatically reviewing security and/or vulnerability releases by hardware and/or software manufacturers, security companies, third parties, etc. In another example, vulnerability repositories (such as a common vulnerabilities and exposures (CVE) repository, vulnerability news releases, etc.) may be periodically parsed in order to identify one or more existing hardware and/or software vulnerabilities. In yet another example, news articles regarding hardware and/or software vulnerabilities may be automatically received from one or more news services and may be parsed in order to identify one or more existing hardware and/or software vulnerabilities.

Further, in one embodiment, determining the vulnerability level of the first storage system includes identifying one or more solutions for existing hardware and/or software vulnerabilities. For example, the solutions may include one or more patches, software and/or firmware updates, etc. In another embodiment, determining the vulnerability level of the first storage system may include comparing the hardware, firmware, and/or software currently implemented within the first storage system to the one or more existing hardware and/or software vulnerabilities and the one or more solutions for existing hardware and/or software vulnerabilities. For example, the vulnerability level may include a vulnerability score (e.g., a numerical score, etc.) determined based on the comparing. In another example, the vulnerability level may include a label (e.g., "vulnerable," "secure," etc.) determined based on the comparing.

Further still, in one embodiment, in response to determining that the first storage system includes hardware, software, and/or firmware that is associated with one or more existing vulnerabilities, it may be determined whether one or more solutions exist for the one or more existing vulnerabilities. For example, in response to determining that no solutions currently exist for the one or more existing vulnerabilities, the vulnerability level may be determined for the first storage system to indicate that the first storage system is vulnerable (e.g., by giving the first storage system a predetermined vulnerability score higher than a vulnerability score for a secure storage system, etc.).

Also, in one embodiment, in response to determining that one or more solutions currently exist for the one or more existing vulnerabilities, it is determined whether the first storage system has currently implemented the one or more solutions. For example, it may be determined whether the first storage system has installed one or more patches that resolve the one or more existing vulnerabilities, etc. In another embodiment, in response to determining that the first storage system has not currently implemented the one or more solutions, the vulnerability level may be determined for the first storage system to indicate that the first storage system is vulnerable (e.g., by giving the first storage system a predetermined vulnerability score higher than a vulnerability score for a secure storage system, etc.).

In addition, in one embodiment, in response to determining that the first storage system has currently implemented the one or more solutions, the vulnerability level may be determined for the first storage system to indicate that the first storage system is secure/not vulnerable (e.g., by giving the first storage system a predetermined vulnerability score lower than a vulnerability score for a vulnerable storage system, etc.). In another embodiment, the determined vulnerability level may be stored in association with the first storage system. For example, the determined vulnerability level may be stored in association with the first storage system within a data repository separate from the first storage system, within the first storage system, etc.

Furthermore, in one embodiment, the vulnerability level determined for the first storage system indicates a level of security that the first storage system is capable of providing. In this way, any security vulnerabilities currently associated with the first storage system may be identified and associated with the first storage system.

Further still, method 500 may proceed with operation 506, where the instance of data is conditionally migrated from the first storage system to a second storage system, based on the classification associated with the instance of data and the vulnerability level of the first storage system. In one embodiment, the instance of data may be conditionally migrated according to one or more policies associated with the instance of data. In another embodiment, a policy implemented within the storage cluster may indicate that instances of data having a classification above a predetermined threshold are to be stored on storage systems having a vulnerability level below a predetermined threshold.

Also, in one embodiment, a policy implemented within the storage cluster indicates that instances of data having a predetermined classification are to be stored on storage systems having a vulnerability level below a predetermined threshold. In another embodiment, a policy implemented within the storage cluster may indicate that instances of data having a predetermined classification are to be stored on storage systems having a predetermined vulnerability level. In yet another embodiment, a policy implemented within the storage cluster may indicate that instances of data having a classification above a predetermined threshold are to be stored on storage systems having a predetermined vulnerability level.

For example, the classification of the instance of data may be compared to a first predetermined threshold. In response to determining that the classification of the instance of data exceeds the first predetermined threshold (e.g., indicating that the instance of data has a high sensitivity, etc.), the vulnerability level of the first storage system may be compared to a second predetermined threshold. If the vulnerability level of the first storage system is below a second predetermined threshold (e.g., indicating that the first storage system has a low vulnerability and/or is secure, etc.), the instance of data may be maintained on the first storage system.

In another example, if the vulnerability level of the first storage system is above the second predetermined threshold (e.g., indicating that the first storage system has a high vulnerability and/or is not secure, etc.), the instance of data may be migrated to the second storage system. In yet another example, the second storage system may have a vulnerability level below the second predetermined threshold (e.g., indicating that the second storage system has a low vulnerability and/or is secure, etc.). In still another example, the second storage system may have a vulnerability level below the vulnerability level of the first storage system (e.g., indicating that the second storage system has a lower vulnerability than the first storage system, is more secure than the first storage system, etc.).

Additionally, in one embodiment, the first storage system and the second storage system may both be located within the storage cluster. For example, the second storage system may be identified in response to determining that the vulnerability level of the first storage system is above the second predetermined threshold.

In this way, in response to determining that the first storage system has a high vulnerability and is currently storing sensitive data, a second storage system may be identified within the storage cluster that has a lower vulnerability than the first storage system that is appropriate for storing the sensitive data (e.g., according to one or more policies, etc.), and the sensitive data may be migrated from the vulnerable first storage system to the secure second storage system.

Further, in one embodiment, the vulnerability level of the first storage system may be updated after the instance of data is migrated from the first storage system to the second storage system. For example, one or more solutions may be implemented within the first storage system in order to eliminate one or more existing vulnerabilities of the first storage system. In another example, the vulnerability level of the first storage system may be adjusted in response to the implementation of the one or more solutions. For example, a vulnerability level for the first storage system may indicate that the first storage system is vulnerable.

Further still, in one example, in response to determining that the first storage system has currently implemented the one or more solutions, the vulnerability level may be updated for the first storage system to indicate that the first storage system is secure/not vulnerable. In another example, in response to the updating of the vulnerability level of the first storage system, the updated vulnerability level may be compared to a second predetermined threshold (e.g., indicating that the first storage system has a low vulnerability and/or is secure, etc.). In yet another example, in response to determining that the updated vulnerability level is below the second predetermined threshold (e.g., indicating that the first storage system has a low vulnerability and/or is secure, etc.), the instance of data may be migrated back to the first storage system.

Also, in one embodiment, a table maps vulnerability levels of storage systems to classifications associated with data instances. For example, the classification associated with the instance of data may be compared to the table in order to determine a corresponding vulnerability level needed by a storage system to store the instance of data. In another example, if the vulnerability level of the first storage system is at or below the corresponding vulnerability level needed to store the instance of data (e.g., indicating that the first storage system has a sufficient security level to store the instance of data), the instance of data may be maintained within the first storage system. In yet another example, if the vulnerability level of the first storage system is above the corresponding vulnerability level needed to store the instance of data (e.g., indicating that the first storage system has an insufficient security level to store the instance of data), the instance of data may be migrated to the second storage system, where the second storage system is predetermined to have a vulnerability level at or below the corresponding vulnerability level needed to store the instance of data (e.g., indicating that the second storage system has a sufficient security level to store the instance of data).

In this way, data security may be improved within the storage cluster by associating predetermined security criteria with data and ensuring that only storage systems meeting the predetermined security criteria store the data. This may prevent the performance of undesired/malicious actions on sensitive data stored within the storage cluster, which may prevent data corruption within the storage cluster. This may also improve a performance of the storage cluster, since the need to replace corrupted data within the cluster may be prevented by appropriately securing the data within the storage cluster. Also, the use of storage space on secure storage systems of a storage cluster may be optimized, such that the storage space is used to prioritize the storage of sensitive data over non-sensitive data.

Figure 6:
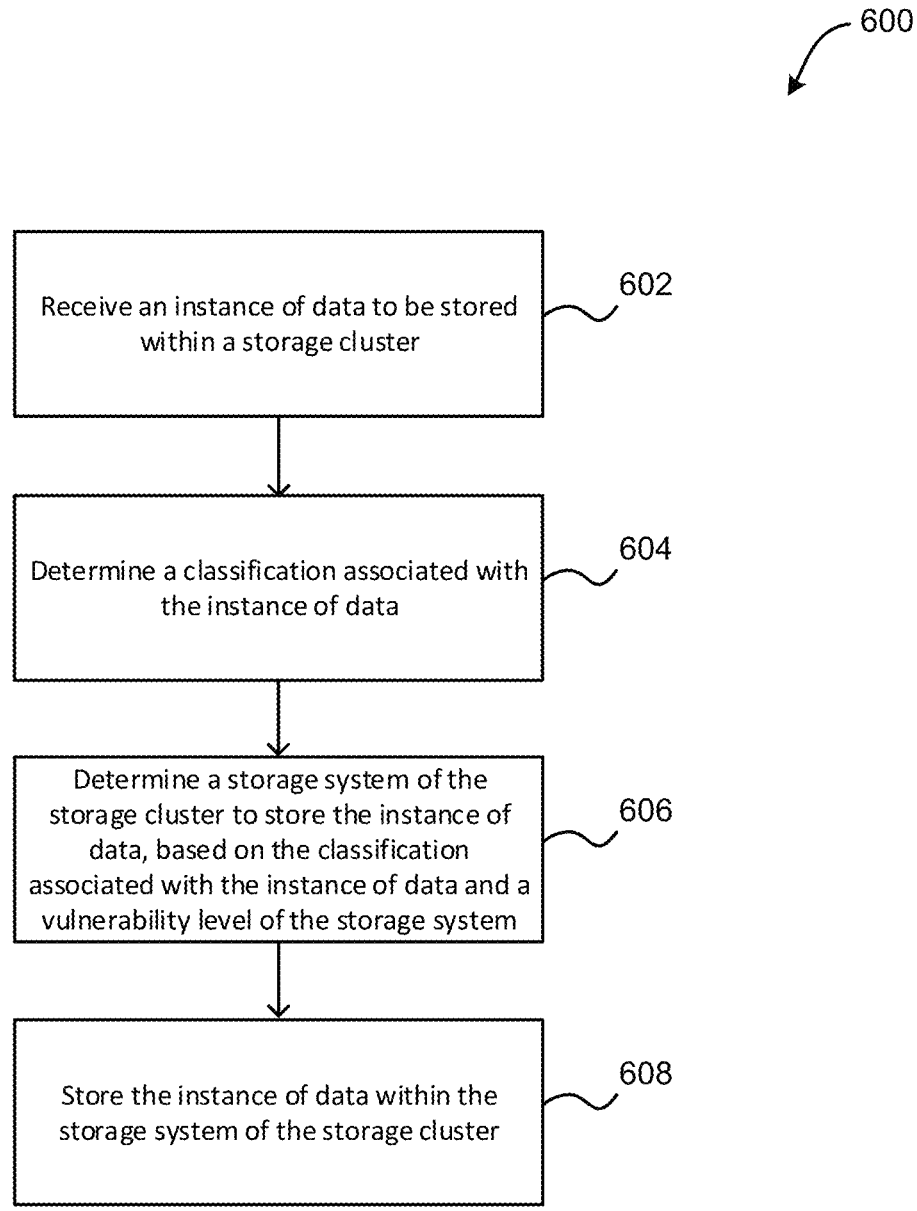
FIG. 6 illustrates a flowchart of a method for storing incoming data in a storage cluster, in accordance with one embodiment.

Now referring to FIG. 6, a flowchart of a method 600 for storing incoming data in a storage cluster is shown according to one embodiment. The method 600 may be performed in accordance with the present invention in any of the environments depicted in FIGS. 1-4 and 8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an instance of data to be stored within a storage cluster is received. In one embodiment, the instance of data may be received by a user, by an application, etc. In another embodiment, the instance of data may be received from a system outside of the storage cluster. In yet another embodiment, the instance of data may be created within the storage cluster.

Additionally, method 600 may proceed with operation 604, where a classification associated with the instance of data is determined. Further, method 600 may proceed with operation 606, where a storage system of the storage cluster is determined to store the instance of data, based on the classification associated with the instance of data and a vulnerability level of the storage system. In one embodiment, the classification associated with the instance of data may be compared to a policy within the storage cluster. In another embodiment, the policy may indicate that only storage systems having a predetermined vulnerability level may store the instance of data. In yet another embodiment, the storage system may be selected from one or more storage systems determined to have the predetermined vulnerability level. For example, the selection may be random, according to a predetermined order, etc.

Further still, method 600 may proceed with operation 608, where the instance of data is stored within the storage system of the storage cluster. In this way, incoming data may be stored within a storage system of a storage cluster that provides an appropriate level of security for the incoming data.

Figure 7:
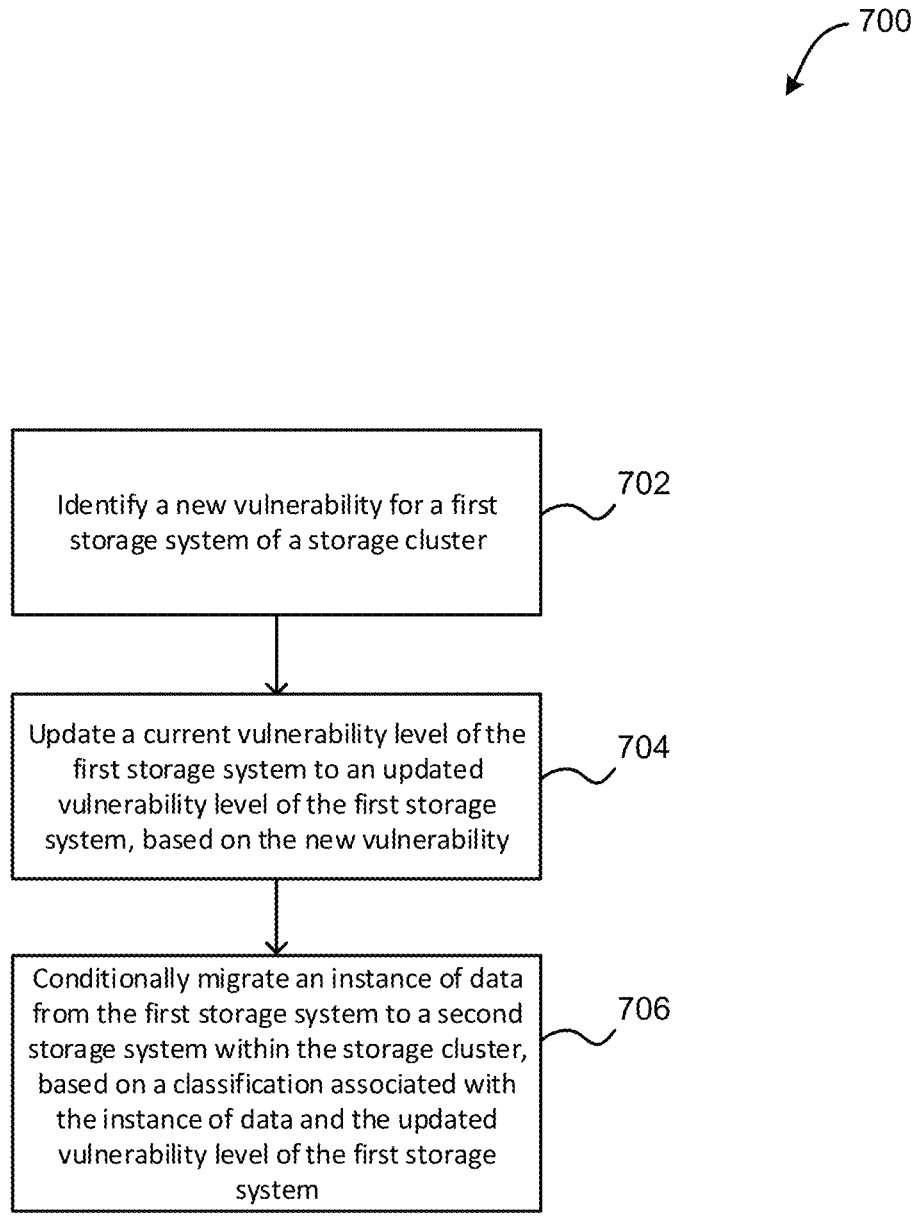
FIG. 7 illustrates a flowchart of a method for migrating data in response to newly received vulnerability information, in accordance with one embodiment.

Now referring to FIG. 7, a flowchart of a method 700 for migrating data in response to newly received vulnerability information is shown according to one embodiment. The method 700 may be performed in accordance with the present invention in any of the environments depicted in FIGS. 1-4 and 8, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a new vulnerability is identified for a first storage system of a storage cluster. In one embodiment, the new vulnerability may be received from one or more vulnerability repositories. In another embodiment, the new vulnerability may be associated with hardware, firmware, and/or software currently implemented within the first storage system.

Additionally, method 700 may proceed with operation 704, where a current vulnerability level of the first storage system is updated to an updated vulnerability level of the first storage system, based on the new vulnerability. In one embodiment, the current vulnerability level may indicate that the first storage system is secure/not vulnerable. In another embodiment, in response to identifying the new vulnerability, and determining that the first storage system has not currently implemented any solutions to the new vulnerability, the vulnerability level may be updated for the first storage system to indicate that the first storage system is vulnerable.

Further, method 700 may proceed with operation 706, where an instance of data is conditionally migrated from the first storage system to a second storage system within the storage cluster, based on a classification associated with the instance of data and the updated vulnerability level of the first storage system. In this way, data may be dynamically transferred to a secure storage system from an insecure storage system, in response to an identification of the insecure storage system.

Figure 8:
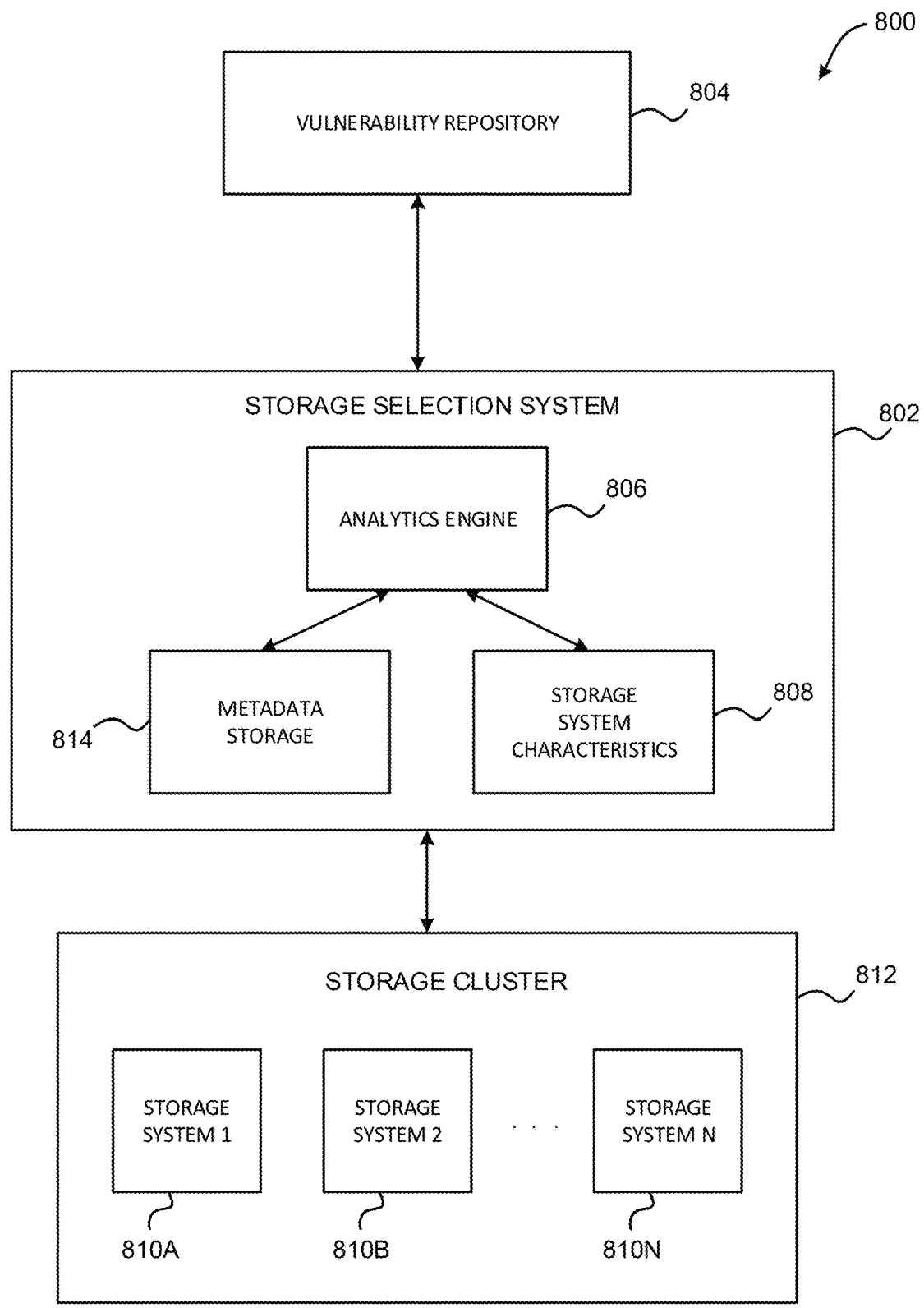
FIG. 8 illustrates an exemplary secure storage environment, in accordance with one embodiment.

FIG. 8 illustrates an exemplary secure storage environment 800, according to one exemplary embodiment. As shown, a storage selection system 802 receives current hardware and/or software vulnerabilities from a vulnerability repository 804. In one embodiment, the vulnerability repository 804 may include one or more vulnerability databases, one or more news services, one or more vulnerability patch web services, etc.

Additionally, in one embodiment, the current hardware and/or software vulnerabilities may be received at the storage selection system 802 from the vulnerability repository 804 as the vulnerabilities are discovered and released via the vulnerability repository 804. In another embodiment, the storage selection system 802 may periodically query the vulnerability repository 804 for updated vulnerabilities.

Further, in one embodiment, an analytics engine 806 of the storage selection system 802 may compare the received current hardware and/or software vulnerabilities to storage system characteristics 808. For example, the storage system characteristics 808 may include a table that identifies hardware, firmware, and/or software currently implemented within each storage system 810A-N of the storage cluster 812. In another embodiment, the analytics engine 806 may identify a vulnerability within a first storage system 810A, based on the comparison.

For example, the analytics engine 806 may identify a software vulnerability that matches software currently installed on the first storage system 810A that is described within the storage system characteristics 808. In response to the identification, the analytics engine 806 may update a vulnerability level for the first storage system 810A to indicate that the first storage system 810A is currently vulnerable.

Further still, in one embodiment, in response to updating the vulnerability level for the first storage system 810A, the analytics engine 806 may identify within metadata storage 814 predetermined data stored within the first storage system 810A that has a predetermined classification (e.g., that indicates a predetermined sensitivity that merits a predetermined level of security, etc.). For example, the analytics engine 806 may classify all data stored within all storage systems 810A-N and may store the classification within the metadata storage 814.

Also, in one embodiment, the analytics engine 806 may determine that the predetermined data stored within the first storage system 810A that has the predetermined classification is to be migrated to a second storage system 810B. For example, the analytics engine 806 may identify a policy indicating that data having the predetermined classification is to be stored on a storage system that is not currently vulnerable. In another example, the analytics engine 806 may identify the second storage system as not currently vulnerable, based on characteristics of the second storage system stored in the storage system characteristics 808 and all received current hardware and/or software vulnerabilities. In yet another example, the analytics engine 806 may determine that the predetermined data stored within the first storage system 810A is to be migrated to the second storage system 810B, based on the policy and the vulnerability levels of the first storage system 810A and the second storage system 810B.

Also, in one embodiment, the storage selection system 802 may initiate a migration of the predetermined data from the first storage system 810A to the second storage system 810B within the storage cluster 812.

In this way, data may be dynamically migrated between storage systems 810A-N within the storage cluster 812, based on vulnerability levels for the storage systems 810A-N, classifications of the data, and one or more preexisting policies. This may maximize a security of the data stored within the storage cluster 812. In addition, in one embodiment, the storage systems 810A-N may be tiered within the storage cluster 812 based on their associated vulnerability levels. For example, the vulnerability level for each of the storage systems 810A-N may be one of high, medium, and low, and each of the storage systems may be placed in a high, medium, or low tier of the storage cluster 812 based on its associated vulnerability level.

Selecting a Secure Storage Controller Based on Cognitive Data Classification

Computer Security and Vulnerability

Computer Security and Vulnerability assessment is a practice to look for potential security weaknesses due to computer system software flaws (i.e. memory safety violations such as buffer overflows or dangling pointers etc.) or hardware firmware issues. Hackers and/or software makers exploit these security risks (vulnerabilities) and disclose them through an industry-wide accepted system from the Common Vulnerabilities Enumeration (CVE) repository, maintained by NIST/MITRE. For every disclosed vulnerability, the original maker of the corresponding software distributes a patch, which is a software or firmware update that closes the vulnerability and organizations need to apply such patches to their assets to close the vulnerability. In one embodiment, OS vendors and chip manufacturers may release patches at different times. Hence it is important to notice that:

Large networks may not be able to apply patches for all vulnerabilities across all their systems at all times to avoid overload on production networks or network downtime and the cost/effort involved in such exercises might be limiting.

Software and firmware makers may not have patches ready to publish for all distributions and/or hardware at the same time.

In another embodiment, storage systems within clusters/networks may each include a processor different from other storage systems within the cluster, such as x86, power, system Z, etc. Additionally, each storage system may use a type of OS platform different from other storage systems within the cluster, such as Linux, Windows or Ubuntu, etc. In another embodiment, vulnerabilities may exist for a particular OS platform and/or processor. For instance, a vulnerability may exist for Linux on an x86 processor, so all storage systems which run Linux on x86 processors may become insecure compare to other storage systems running other CPU processors and OS platforms.

MetaOcean for Storage Islands

We are experiencing an exponential data-explosion in today's world. Most of this data is unstructured in nature, and is growing at a large scale. Also, the data may be spread across multiple storage islands in a typical enterprise deployment which produces data junkyard. There may not be any basic organization to it unless data has been processed. On the other hand, data is getting generated at such a rapid speed, that it becomes practically challenging to classify the sensitive/critical data across these storage islands where multiple terabytes of data are generated every day and organizations fail to identify which data needs more protection or which data needs less. This may add inefficiencies to the system, which may end up spending unnecessary space on more secured data subsystems for non-sensitive data.

Protecting Sensitive Data

Software Defined Storage (SDS) like IBM Spectrum Scale is hosted over many different types of servers having different hardware types from different vendors and running different OS types. This storage cluster may be spread across heterogeneous hardware and software platforms, and may host a large amount of data where the data can be categorized with different sensitivity levels. Now when security vulnerabilities are released for different hardware/software, those vulnerabilities may be applicable to only a portion of the hardware/software within the storage cluster, and fixes may be available for some of the hardware/software and not for others. This may result in the storage of sensitive data on vulnerable servers within the cluster, while non-sensitive data may be stored on secure/patched servers. This makes the sensitive data residing on SDS cluster vulnerable when compared to non-sensitive data.

It is therefore desirable to integrate mechanisms within SDS that indicate exactly which data (files/objects) hosted over the SDS cluster over heterogeneous hardware/software servers contains sensitive/critical information as per an organization's policy, and allows the SDS to autonomously auto tier data to ensure that sensitive/critical files/objects reside on servers which are less vulnerable than other servers within a cluster at any given point of time.

Generalized Solution

In one embodiment, MetaOcean may be leveraged to perform a continuous scanning of file and object data, and to tag data with specific compliance levels (e.g., Level 1=Basic to Level 5=Stringent). In another embodiment, in a software defined storage (SDS) cluster where commercial off the shelf (COTS) systems act as storage systems to store the data (where these systems can implement different hardware architectures and run different OS types and/or versions), continual scanning may be performed, and a vulnerability status of all the systems within the cluster may be maintained.

Additionally, in one embodiment, the files and objects that are tagged by MetaOcean with their compliance level may be auto moved/tiered within the SDS cluster, such that the COTS systems with minimal exposure may hold the data that is tagged as stringent/Level 5 while data having a lower compliance level may reside on COTS systems with more exposure (or COTS systems that have not been patched for one or more potential vulnerabilities).

Data Categorization

In one embodiment, classification of data may be performed at a massive data scale by leveraging Watson deep data inspection techniques such as IBM Watson Content analytics, Sentiment Analytics, Contextual Views, etc. based on natural language classification as well as Watson APIs such as speech to text, visual recognition, etc. These techniques help in capturing metadata information about the data on storage subsystem. Specifically, metadata from a storage subsystem may be scanned to understand which of the files/objects contain sensitive or critical information based on policies defined by storage admins, or in addition to system-defined default policies.

Policies may trigger deep data inspection leveraging Watson techniques that extract facets from the candidate (file/object) data, and the facets may be indexed into MetaOcean. The system may then query MetaOcean to identify candidate (e.g., sensitive/critical) documents based on facets available and calculate the sensitivity/criticality level to define a protection level. Also, MetaOcean may trigger a job for cognitive insights of certain data based on live events and may help identify the data to be protected on more secured/less vulnerable storage subsystems, in near real time in a highly scalable and high performant fashion.

This may enable previously unattainable levels of scalability and data insight for data protection. Other techniques such as header extraction may also be used in place of Watson APIs to derive insight about the content of the candidate data for encryption. Additionally, IBM StoredIQ may be utilized to identify compliance data such as personal information required for general data protection regulation (GDPR) like compliance, which may also be used for identifying and tagging the data with a security level.

In this way, a compliance/sensitivity level may be identified for each of a plurality of instances of data, and may be saved in association with the data.

Further, in one embodiment, a vulnerability store such as a product security incident response team (PSIRT) database, Watson News service, and/or a vendor's vulnerability patch availability webservice may trigger an event to MetaOcean. When MetaOcean receives the event highlighting a new vulnerability, it may perform a mapping against the heterogeneous hardware & software cluster over which SDS is hosting data. MetaOcean may then identify within the cluster which storage servers are vulnerable and which one are not, in view of the new vulnerability.

In this way, a current list of systems that are currently vulnerable and may be determined in response to a notification of a new vulnerability.

Further still, in one embodiment, MetaOcean may know the categorization of data by compliance/sensitivity levels, as well as at which storage servers the data is residing and the state of each storage server in the heterogenous cluster. Based on his knowledge, MetaOcean may trigger SDS software tiering and auto movement of data such that the highest rated compliance/sensitivity data is moved to the most compliant storage rich servers (this may also result in moving he least sensitive data to potential non-patched storage systems).

In one example, a system may determine a processor and OS platform which is affected by a new vulnerability within a given cluster, and may find the vulnerable combination of processor and OS platform in a data center configuration table and may mark storage systems having the vulnerable combination as less secure until a patch is applied to the system. Based on these marked storage systems, the system may choose an appropriate storage subsystem to which sensitive data stored on the marked storage systems is to be moved, whereas other unmarked storage systems may still be used for the storage of sensitive data.

In this way, software defined storage may trigger data movement and tiering such that sensitive data is moved to storage servers having a lower vulnerability than other storage servers marked as vulnerable. In another embodiment, vulnerability reporting, patching of systems, and categorization of data to different compliance levels may be continuous and dynamic.

Database Query Implementation

In one embodiment, one or more applications and/or users write files/objects to file systems/object stores. In another embodiment, the storage systems send events containing system metadata about the written files/objects. These events may be added to a persistent message queue and MetaOcean consumers may read the events from the queue, normalize them, and insert them into a NoSQL DB.

Additionally, in one embodiment, deep data inspection may be performed on the files using Watson techniques or by extracting file headers and extract facets from inspection. In another embodiment, these extracted facets may be inserted into a MetaOcean NoSQL database. In yet another embodiment, MetaOcean may send a query to a key-store based database for determining the content of candidate data to be protected in an enhanced manner. For example, the facets may indicate that file f1 has a SSN in it, file f2 has an email backup, and file f3 is movie file.

Further, in one embodiment, the storage subsystem may move the existing data, or may place new data, based on data compliance or/and sensitivity levels determined using MetaOcean facets, as well as a vulnerability assessment ranking of each storage subsystem. In another embodiment, a storage system may register an event consumer in MetaOcean and may directly receive events from storage pertaining to which files have been modified as well as what is in the files via deep data inspection, to eliminate MetaOcean queries and trigger an instantaneous data protection mechanism for improved resiliency.

Event Consumer Implementation

In one embodiment, one or more applications and/or users write files/objects to file systems/object stores. In another embodiment, the storage systems send events containing the system metadata about the written files/objects. In yet another embodiment, these events may be put onto a persistent message queue and MetaOcean consumers may read the events from the queue, normalize them, and insert them into a NoSQL database.

Additionally, in one embodiment, deep data inspection may be performed on the files using Watson techniques or by extracting file headers and extract facets from inspection. In another embodiment, these extracted facets may be inserted into the MetaOcean NoSQL database.

Further, in one embodiment, an event consumer also reads the events from the queue in real time which contains both the system metadata and the facets. Now the storage subsystem may move the existing data or place new data based on data compliance or/and sensitivity levels using MetaOcean facets and vulnerability assessment rankings of storage subsystems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   determining a classification associated with an instance of data;
   determining a vulnerability level of a first storage system at which the instance of data is currently located;
   comparing the classification of the instance of data to a first predetermined threshold;
   in response to determining that the classification of the instance of data exceeds the first predetermined threshold, comparing the vulnerability level of a first storage system to a second predetermined threshold;
   in response to determining that the vulnerability level of the first storage system is below the second predetermined threshold, maintaining the instance of data on the first storage system; and
   in response to determining that the vulnerability level of the first storage system is above the second predetermined threshold, migrating the instance of data to a second storage system, where the second storage system has a vulnerability level below the second predetermined threshold.

2. The computer-implemented method of claim 1, wherein determining the classification includes performing content analytics or sentiment analytics on the instance of data to determine metadata associated with the instance of data.

3. The computer-implemented method of claim 1, wherein the classification includes a compliance level for the instance of data that indicates a sensitivity of the instance of data.

4. The computer-implemented method of claim 1, wherein determining the vulnerability level of the first storage system includes comparing hardware, firmware, and software currently implemented within the first storage system to one or more existing hardware and software vulnerabilities and one or more solutions for existing hardware and software vulnerabilities.

5. The computer-implemented method of claim 1, wherein in response to determining that no solutions currently exist for one or more existing vulnerabilities of the first storage system, the vulnerability level is determined for the first storage system to indicate that the first storage system is vulnerable, by giving the first storage system a predetermined vulnerability score higher than a vulnerability score for a secure storage system.

6. The computer-implemented method of claim 1, wherein in response to determining that the first storage system has not currently implemented one or more solutions for one or more existing vulnerabilities of the first storage system, the vulnerability level is determined for the first storage system to indicate that the first storage system is vulnerable, by giving the first storage system a predetermined vulnerability score higher than a vulnerability score for a secure storage system.

7. The computer-implemented method of claim 1, wherein in response to determining that the first storage system has currently implemented one or more solutions for one or more existing vulnerabilities of the first storage system, the vulnerability level is determined for the first storage system to indicate that the first storage system is secure, by giving the first storage system a predetermined vulnerability score lower than a vulnerability score for a vulnerable storage system.

8. The computer-implemented method of claim 1, wherein the vulnerability level determined for the first storage system indicates a level of security that the first storage system is capable of providing.

9. The computer-implemented method of claim 1, wherein the first storage system and the second storage system are both located within a storage cluster.

10. The computer-implemented method of claim 1, wherein the instance of data is migrated to the second storage system in response to determining that the vulnerability level of the first storage system is above the second predetermined threshold, and further comprising:
updating the vulnerability level of the first storage system to indicate that the first storage system is secure in response to determining that the first storage system has implemented one or more solutions to eliminate one or more existing vulnerabilities of the first storage system;
in response to the updating of the vulnerability level of the first storage system, comparing the updated vulnerability level to the second predetermined threshold; and
migrating the instance of data back to the first storage system in response to determining that the updated vulnerability level is below the second predetermined threshold.

11. A computer program product for selecting data storage based on data and storage classifications, the computer program product comprising a computer readable storage medium having program instructions embodied therewith, the program instructions executable by a processor to cause the processor to perform a method comprising:
determining, by the processor, a classification associated with an instance of data;
determining, by the processor, a vulnerability level of a first storage system at which the instance of data is currently located;
comparing, by the processor, the classification of the instance of data to a first predetermined threshold;
in response to determining that the classification of the instance of data exceeds the first predetermined threshold, comparing, by the processor, the vulnerability level of a first storage system to a second predetermined threshold;
in response to determining that the vulnerability level of the first storage system is below the second predetermined threshold, maintaining, by the processor, the instance of data on the first storage system; and
in response to determining that the vulnerability level of the first storage system is above the second predetermined threshold, migrating, by the processor, the instance of data to a second storage system, where the second storage system has a vulnerability level below the second predetermined threshold.

12. The computer program product of claim 11, wherein determining the classification includes performing content analytics or sentiment analytics on the instance of data to determine metadata associated with the instance of data.

13. The computer program product of claim 11, wherein the classification includes a compliance level for the instance of data that indicates a sensitivity of the instance of data.

14. The computer program product of claim 11, wherein determining the vulnerability level of the first storage system includes comparing hardware, firmware, and software currently implemented within the first storage system to one or more existing hardware and software vulnerabilities and one or more solutions for existing hardware and software vulnerabilities.

15. The computer program product of claim 11, wherein in response to determining that no solutions currently exist for one or more existing vulnerabilities of the first storage system, the vulnerability level is determined for the first storage system to indicate that the first storage system is vulnerable, by giving the first storage system a predetermined vulnerability score higher than a vulnerability score for a secure storage system.

16. The computer program product of claim 11, wherein in response to determining that the first storage system has not currently implemented one or more solutions for one or more existing vulnerabilities of the first storage system, the vulnerability level is determined for the first storage system to indicate that the first storage system is vulnerable, by giving the first storage system a predetermined vulnerability score higher than a vulnerability score for a secure storage system.

17. The computer program product of claim 11, wherein in response to determining that the first storage system has currently implemented one or more solutions for one or more existing vulnerabilities of the first storage system, the vulnerability level is determined for the first storage system to indicate that the first storage system is secure, by giving the first storage system a predetermined vulnerability score lower than a vulnerability score for a vulnerable storage system.

18. The computer program product of claim 11, wherein the vulnerability level determined for the first storage system indicates a level of security that the first storage system is capable of providing.

19. A system, comprising:
a processor; and
logic integrated with the processor, executable by the processor, or integrated with and executable by the processor, the logic being configured to:
determine a classification associated with an instance of data;
determine a vulnerability level of a first storage system at which the instance of data is currently located;
compare the classification of the instance of data to a first predetermined threshold;
in response to determining that the classification of the instance of data exceeds the first predetermined threshold, compare the vulnerability level of a first storage system to a second predetermined threshold;
in response to determining that the vulnerability level of the first storage system is below the second predetermined threshold, maintain the instance of data on the first storage system; and
in response to determining that the vulnerability level of the first storage system is above the second predetermined threshold, migrate the instance of data to a second storage system, where the second storage system has a vulnerability level below the second predetermined threshold.

20. A computer-implemented method, comprising:
determining a classification associated with an instance of data;
determining a vulnerability level of a first storage system at which the instance of data is currently located, where the vulnerability level of the first storage system indicates that the first storage system is vulnerable;
migrating the instance of data from the first storage system to a second storage system, based on the classification associated with the instance of data and the vulnerability level of the first storage system;
in response to determining that the first storage system has implemented one or more solutions to eliminate one or more existing vulnerabilities of the first storage system, updating the vulnerability level of the first storage system to indicate that the first storage system is secure;
in response to the updating of the vulnerability level of the first storage system, comparing the updated vulnerability level to a predetermined threshold; and
in response to determining that the updated vulnerability level is below the predetermined threshold, migrating the instance of data back to the first storage system from the second storage system.

21. A computer program product for selecting data storage based on data and storage classifications, the computer program product comprising a computer readable storage medium having program instructions embodied therewith, the program instructions executable by a processor to cause the processor to perform a method, comprising:
determining, by the processor, a classification associated with an instance of data;
determining, by the processor, a vulnerability level of a first storage system at which the instance of data is currently located, where the vulnerability level of the first storage system indicates that the first storage system is vulnerable;
migrating, by the processor, the instance of data from the first storage system to a second storage system, based on the classification associated with the instance of data and the vulnerability level of the first storage system;
in response to determining that the first storage system has implemented one or more solutions to eliminate one or more existing vulnerabilities of the first storage system, updating, by the processor, the vulnerability level of the first storage system to indicate that the first storage system is secure;
in response to the updating of the vulnerability level of the first storage system, comparing, by the processor, the updated vulnerability level to a predetermined threshold; and
in response to determining that the updated vulnerability level is below the predetermined threshold, migrating, by the processor, the instance of data back to the first storage system from the second storage system.

* * * * *